US009342579B2

(12) United States Patent
Cao et al.

(10) Patent No.: US 9,342,579 B2
(45) Date of Patent: May 17, 2016

(54) VISUAL ANALYSIS OF MULTIDIMENSIONAL CLUSTERS

(75) Inventors: Nan Cao, Xi'An (CN); David H. Gotz, Purdys, NY (US); Jimeng Sun, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 13/149,132

(22) Filed: May 31, 2011

(65) Prior Publication Data
US 2012/0311496 A1 Dec. 6, 2012

(51) Int. Cl.
G06F 17/30 (2006.01)

(52) U.S. Cl.
CPC .............................. G06F 17/30601 (2013.01)

(58) Field of Classification Search
CPC .............................................. G06F 17/30601
USPC .......................................................... 715/821
See application file for complete search history.

(56) References Cited

U.S. PATENT DOCUMENTS

| 5,790,121 A * | 8/1998 | Sklar ................. G06F 17/30572 715/835 |
| 5,870,559 A * | 2/1999 | Leshem .................. G06F 11/32 707/E17.116 |
| 6,025,843 A * | 2/2000 | Sklar ................. G06F 17/30241 715/841 |
| 6,583,794 B1 * | 6/2003 | Wattenberg ................... 715/708 |
| 2006/0136478 A1 * | 6/2006 | Berkner ........................ 707/102 |
| 2007/0168856 A1 * | 7/2007 | Berkner et al. ............... 715/517 |
| 2008/0133567 A1 * | 6/2008 | Ames ................ G06F 17/30713 |
| 2011/0055755 A1 * | 3/2011 | Chen ..................... G06F 3/0482 715/810 |
| 2011/0225155 A1 * | 9/2011 | Roulland et al. ............... 707/737 |
| 2012/0013619 A1 * | 1/2012 | Brath ............................ 345/441 |
| 2012/0197950 A1 * | 8/2012 | Dayal .................... G06Q 30/02 707/822 |

OTHER PUBLICATIONS

Chen et al., "Icon-based Visualization of Large High-Dimensional Datasets", Proceedings of the 3rd IEEE International Conference on Data Mining (ICDM'03), pp. 1-4, 2003.*
Jeong et al., "Comparing Two Interface Tools in Performing Visual Analytics Tasks", Proceedings of the IEEE Symposium on Visual Analytics Science and Technology, pp. 219-220, Oct. 12, 2009.*

(Continued)

Primary Examiner — Jennifer To
Assistant Examiner — Joseph R Burwell
(74) Attorney, Agent, or Firm — Ryan, Mason & Lewis, LLP

(57) ABSTRACT

Visualization techniques are provided for a clustered multidimensional dataset. A data set is visualized by obtaining a clustering of a multidimensional dataset comprising a plurality of entities, wherein the entities are instances of a particular concept and wherein each entity comprises a plurality of features; and generating an icon for at least one of the entities, the icon having a plurality of regions, wherein each region corresponds to one of the features of the at least one entity, and wherein a size of each region is based on a value of the corresponding feature. Each icon can convey statistical measures. A stabilized Voronoi-based icon layout algorithm is optionally employed. Icons can be embedded in a visualization of the multidimensional dataset. A hierarchical encoding scheme can be employed to encode a data cluster into the icon, such as a hierarchy of cluster, feature type and entity.

18 Claims, 12 Drawing Sheets

(56) References Cited

OTHER PUBLICATIONS

Keim, "Designing Pixel-Oriented Visualization Techniques: Theory and Applications", IEEE Transactions on Visualization and Computer Graphics, v. 6, n. 1, pp. 59-78, Jan. 2000.*
Keogh et al., "Intelligent Icons: Integrating Lite-Weight Data Mining and Visualization into GUI Operating Systems", Proceedings of the Sixth International Conference on Data Mining (ICDM'06), 2006.*
Kosara et al., "Parallel Sets: Interactive Exploration and Visual Analysis of Categorical Data", IEEE Transactions on Visualization and Computer Graphics, v. 12, n. 4, pp. 558-568, Jul. 2006.*
Nocke et al., "Icon-based Visualization using Mosaic Metaphors", Proceedings of the Ninth International Conference on Information Visualization (IV'05), 2005.*
van Walsum et al., "Feature Extraction and Iconic Visualization", IEEE Transactions on Visualization and Computer Graphics, v. 2, n. 2, pp. 111-119, Jun. 1996.*
Yang et al., "Visual Hierarchical Dimension Reduction for Exploration of High Dimensional Datasets," Proc. Joint IEEE TCVG-Eurographics Symposium on Visualization, pp. 19-28, 2003.*
Hong et al., "GVis: A scalable visualization framework for genomic data", EuroVis, pp. 191-198, 2005.*
Inselberg et al., "Parallel Coordinates: A Tool for Visualizing Multi-Dimensional Geometry", in Proceedings of IEEE Conf. on Visualization, pp. 361-379 (1990).
H. Chernoff, "The Use of Faces to Represent Points in k-dimensional Space Graphically", Journal of American Statistical Association, 68(342):361-368 (1973).
Henry et al., "Nodetrix: a Hybrid Visualization of Social Networks", IEEE Transactions on Visulaizations and Computer Graphics, p. 3 (2007).
Yang et al., "Value and Relations Display: Interactive Visual Exploration of Large Data Sets with Hundreds of Dimensions", IEEE Trans Vis Comp Graph, p. 494-507 (2007).
Keim et al., "VisDB: Database Exploration Using Multidimensional Visualization", IEEE Computer Graphics and Applications, 14(5):40-49 (2002).
Ankerst et at., "Similarity Clustering of Dimensions for an Enhanced Visualization of Multidimensional Data", IEEE Symposium on Information Visualization, p. 52-60 (1998).
Balzer et al., "Voronoi Treemaps", IEEE Symposium on Information Visualization 0:7 (2005).
Bruls et al., "Squarified Treemaps", In Proceedings of the Joint Eurographics and IEEE TCVG Symposium on Visualization (1999).
Climer et al., "Rearrangement Clustering: Pitfalls, Remedies and Applications", The Journal of Machine Learning Research, 7:919-943 (2006).
Du et al., "Centroidal Voronoi Tesselations: Applications and Algorithms", SIAM review, 41(4):637-676 (1999).
Dwyer et al., "Fast Node Overlap Removal", Graph Drawing, p. 153-164 (2006).
Eisen et al., "Cluster Analysis and Display of Genome-Wide Expression Patterns", Proceedings of the National Academy of USA, 95:14863-14868 (1998).
Elmqvist et al., "Rolling the dice: Multidimensional Visual Exploration Using Scatterplot Matrix Navigation", IEEE Transactions on Vis. & Comp.Graphics, p. 1141-1148 (2008).
M. Friendly, "Corrgrams", The American Statistician, 56(4):316-324 (2002).
Friendly et al., "Effect Ordering for Data Displays", Computational Statistics & Data Analysis, 43(4):509-539 (2003).
Fua et al., "Hierarchical Parallel Coordinates for Exploration of Large Datasets". Proceedings of IEEE Conference on Visualization, p. 43-508 (1999).
Gasner et al., "Graph Drawing by Stress Majorization", Graph Drawings, p. 239-250 (2005).
D. Gotz, "Dynamic Voronoi Treemaps: A Visualization Technique for Timevarying Hierarchical Data", Technical Report, IBM (2011).
D. Holten, "Hierarchical Edge Bundles: Visualization of Adjancy Relations in Hierarchical Data", IEEE Transactions on Visualization and Computer Graphics, p. 741-748 (2006).
Holten et al., "Evaluation of Cluster Identification Performance for Different PCP Variants", Computer Graphics Forum, v. 29, p. 793-802 (2010).
Johansson, "Interactive Dimensionality Reduction Through User-Defined Combinations of Quality Metrics", IEEE Transactions on Vis. and Comp. Graphics, 15(6):993-1000 (2009).
D. Keim, "Information Visualization and Visual Data Mining", IEEE Transactions on Visualization and Computer Graphics, 8(1):1-8 (2002).
Keim et al., "Visualization Techniques for Mining Large Databases: A Comparison", IEEE Transactions on Knowledge and Data Engineerings 8(6):923-938 (2002).
Novakova et al., "Multidimensional clusters in RadViz", Proceedings of WSEAS International Conference on Simulation, Modelling and Optimization, p. 470-475 (2006).
M. Novotny, "Visually Effective Information Visualization of Large Data", Proceedings of the Central European Seminar on Computer Graphics, p. 41-48 (2004).
Pham et al., "Visualization of Diversity in Large Multivariate Data Sets", IEEE Transactions and Visualizatiopn and COmputer Graphics, 16: 1053-1062 (2010).
Pickett et al., "Iconographic Displays for Visualizing Multidimensional Data", Proceedings of Conference on Systems, Man and Cybernetics, v. 514, p. 519 (1988).
Post et al., "Iconic Techniques for Feature Visualization", Proceedings of IEEE Conference on Visualization, p. 288 (1995).
Seo et al., "Interactively Exploring Hierarchical Clustering Results", IEEE Computer, 35:80-86 (2002).
B. Shneiderman, "Tree Visualization with Treemaps: 2-d SPace-Filling Approach", ACM Transactions on Graphics, 11(1):92-99 (1992).
Shneiderman et al., "Ordered Treemap Layouts", IEEE Symposium on INformation Visualization, v. 2001, p. 73-8 (2001).
Sud et al, "Fast Dynamic Voronoi Treemaps", IEEE Symposium on Voronoi Diagrams (2010).
Tatu et al., "Combining Automated Anal. and Vis. Techniques for Effective Exploration of High-Dimensional Data", IEEE Symposium on Vis. Analytics Sci & Tech, p. 59-66 (2009).
Wood et al., "Spatially Ordered Treemaps", IEEE Transactions on Visualization and Computer Graphics, 14(6):1348-1355, 2008.
Yuan et al., "Scattering Points in Parallel Coordinates", IEEE Transactions on Visualization and Computer Graphics, p. 1001-1008 (2009).
Zhou et al., "Visual Clustering in Parallel Coordinates", Computer Graphics Forum, v. 27, p. 1047-1054 (2008).

* cited by examiner

| METRICS | | VISUAL CUES |
|---|---|---|
| SD | $\sigma$ | VARIABILITY |
| SKEWNESS | $\gamma = \mu_3/\sigma^3$ | ASYMMETRY |
| KURTOSIS | $\kappa = \mu_4/\sigma^4 - 3$ | PEAKNESS |
| DIFFERENCE | $f_i - \mu$ | QUALITY AND OUTLIER |
| UNIFORMITY | $\Sigma c_{ij}^2$ | FEATURE CO-OCCURRENCE |
| CONTRAST | $\Sigma c_{ij} (f_i - f_j)^2$ | DOMINATION |

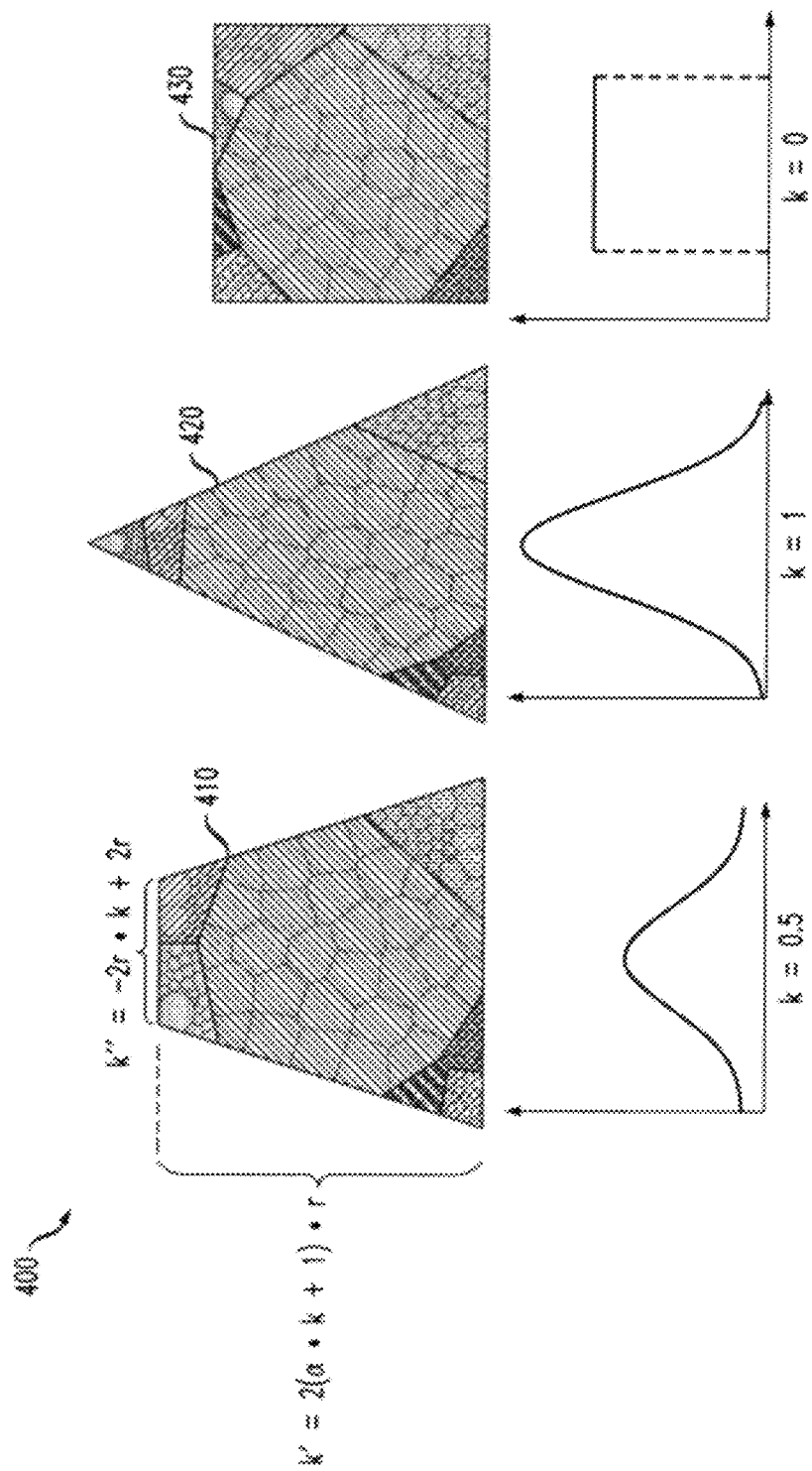

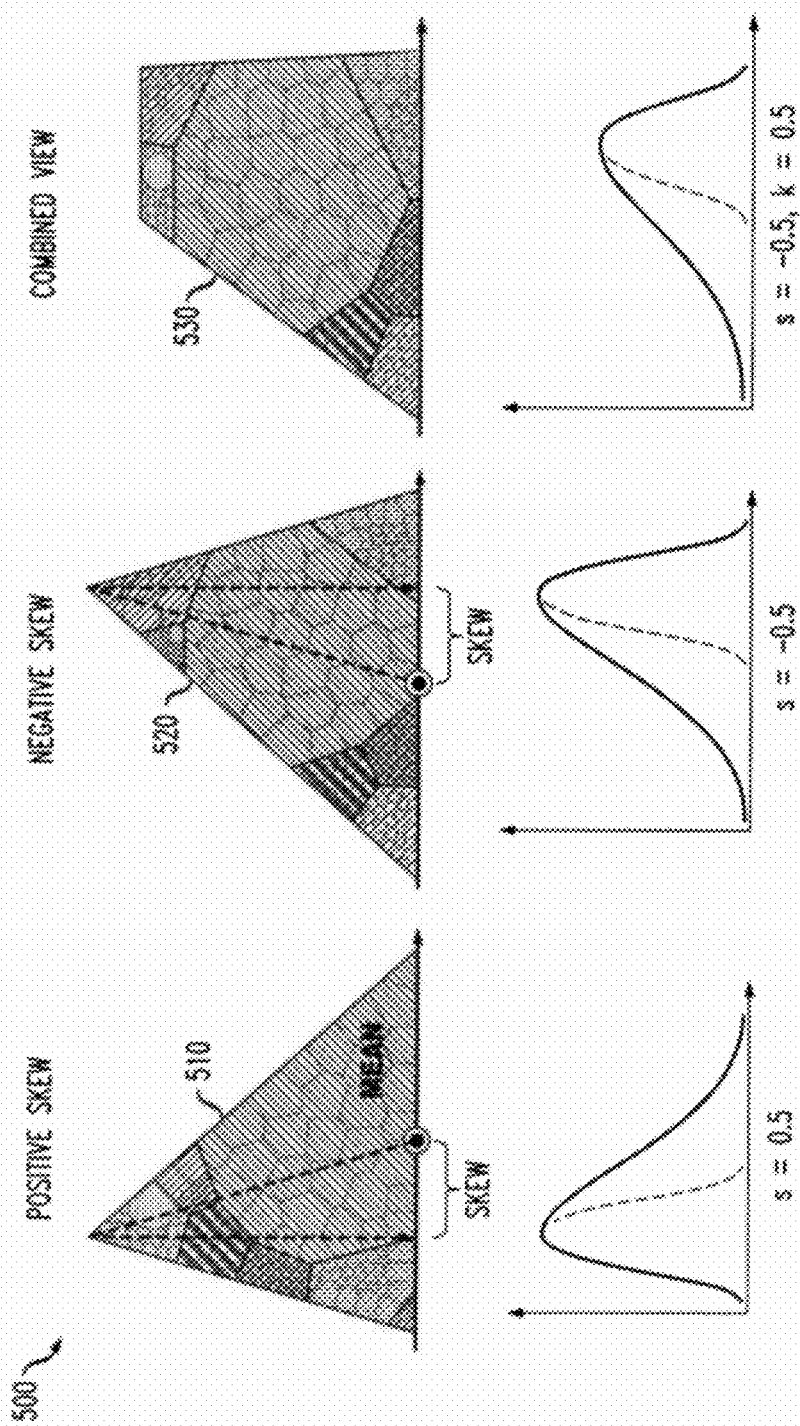

FIG. 7

```
ALGORITHM 1: VoronoiIconLayout()

Data: S (s_1, ...,s_N), V, ε, pre(s_1), ..., pre(s_N)
 Result: coordinates of each site X(X_1, X_2, ...,X_N)
 begin
    if pre(S) is not empty then
     |  X_i' = pre(s_i);
    else
     |  X_i' = random locations within V;
    stress' = 10000 //give a very large value;
    while ratio > ε do
       //the coordinate update based on stress majorization;
```

$$X_i = \frac{\sum_{i<j} w_{ij}\left(x_j' + d_{ij}(x_i' + x_j')\, inv(\|X_i' - X_j'\|)\right)}{\sum_{i<j} w_{ij}};$$

```
       compute Voronoi tessellation v_i according to X_i;
       compute c_i according to v_i;
       X_i = μ_1·(X_i = c_i) + μ_2·X_i + μ_3·(X_i − pre(s_i));
       w_i = w_i·(1 + (desired_i − a_i)/desired_i); //adjust weight
       if w_i < 1 then
        |  w_i = 1
       r = min‖X_i − X_j‖²/(w_i + w_j);
       if r < 1 then
        |  w_i = w_i·r
       str_1 = Σ_i‖X_i − c_i‖²; str_2 = Σ_i‖X_i − pre(X_i)‖²;
       str_3 = Σ_{i<j}(‖X_i − X_j‖ − d_{ij})²;
       stress = Σ_k(μ_k·str_k);
       ratio = (stress' − stress)/stress';
       μ_k = μ_k·(1 + (stress − str_k)/stress);
       normalize μ_k;
       X_i' = X_i;
       stress' = stress;
```

VISUAL ANALYSIS OF MULTIDIMENSIONAL CLUSTERS

FIELD OF THE INVENTION

The present invention relates generally to the electrical, electronic and computer arts, and, more particularly, to information visualization techniques.

BACKGROUND OF THE INVENTION

Clustering is a widely used method to group data entities into subsets called clusters such that the entities in each cluster are similar in some way. A powerful feature of clustering algorithms is that they can generate clusters without any pre-defined labels or categories, which makes them an ideal choice for analyzing data with little or no a priori information. Unlike classification, in which categories with clear semantic meanings are pre-defined, clustering by definition works without these initial constraints on how data entities should be grouped. Users are only required to choose a distance function (e.g., Euclidean distance) that measures how similar two data items are in a feature space, and some other parameters such as the number of clusters or a maximum cluster diameter. Clustering algorithms will then automatically partition data.

While this clustering technique is powerful, users often have difficulty understanding the semantic meaning of the resulting clusters and evaluating the quality of the results, especially for high-dimensional data. There are several issues which make understanding and evaluating clustering results difficult. First, for high-dimensional data, the entities that are grouped together are close in a high-dimensional feature space. However, their similarity may be mainly because of their closeness on a subset of dimensions instead of all dimensions. Understanding these abstract relationships can be challenging. Moreover, a cluster may contain several different sub-clusters that have different semantic meanings for users. This sub-cluster structure is usually hard to detect.

Second, as unsupervised learning processes use no semantic knowledge or pre-defined categories, clustering algorithms often require users to input some parameters in advance. For example, users must provide the number of clusters (i.e., k) for the well known K-means algorithm. However, it is challenging to select a proper k value for the underlying data. Therefore, algorithms such as K-means algorithms might group together entities that are semantically different (when k is smaller than the real number of clusters) or separate entities that are semantically similar (when k is larger than the real number of clusters). Thus, users need some way to evaluate and refine the clustering results.

Information visualization can be of great value in addressing these issues. For example, techniques such as scatter plot matrices, parallel coordinates, and RadViz have been used to visually explain the results of clustering algorithms. Some algorithms focus on revealing the multi-attribute values of clusters to help users understand the semantic meaning of clusters while others provide visual cues for the cluster quality. However, none of these techniques offer a complete solution for cluster interpretation, evaluation, and refinement.

A need therefore exists for a visualization technique that allows users to understand the semantic meaning of various clusters, evaluate their qualities, compare different clusters, and refine clustering results as necessary. A further need exists for a visualization technique that can be embedded into various visual displays or presentations.

SUMMARY OF THE INVENTION

Generally, visualization techniques are provided for a clustered multidimensional dataset. According to one aspect of the invention, a data set is visualized by obtaining a clustering of a multidimensional dataset comprising a plurality of entities, wherein the entities are instances of a particular concept and wherein each entity comprises a plurality of features; and generating an icon for at least one of the entities, the icon having a plurality of regions, wherein each region corresponds to one of the features of the at least one entity, and wherein a size of each region is based on a value of the corresponding feature.

Each of the features can be uniquely encoded in the generated icon, for example, using a unique color or hash pattern. For example, when each of the features are encoded with a unique color, a distribution of the colors can indicate a distribution of the corresponding feature value.

According to another aspect of the invention, a number of user interactions are provided that allow a user to group icon clusters into larger clusters using a merge operation, or to perform split operations on icons. A merge operation can decompose a plurality of icons into corresponding feature values and then regroup the feature values into the larger single icon. Cluster changes can optionally be animated following a merge or split operation.

According to yet another aspect of the invention, each icon conveys one or more statistical measures. For example, an outer shape of each icon can convey statistical measures. In a further variation, a color, hash pattern or shading of each of the plurality of regions can convey statistical measures.

In one exemplary embodiment, a stabilized Voronoi-based icon layout algorithm is employed to substantially maintain a stability of Voronoi regions when cluster changes occur. Likewise, a stabilized Voronoi-based icon layout algorithm can be employed to substantially maintain a predefined order for regions within an icon that places Voronoi regions next to each other according to semantic similarities.

An additional aspect of the invention includes the ability to embed the icons in a visualization of the multidimensional dataset. A hierarchical encoding scheme can be employed to encode a data cluster into the icon, such as a hierarchy of cluster, feature type and entity.

A more complete understanding of the present invention, as well as further features and advantages of the present invention, will be obtained by reference to the following detailed description and drawings.

BRIEF DESCRIPTION OF THE DRAWINGS

FIG. 3 is a sample table summarizing the moments and visual cues, discussed hereinafter, for various metrics;

FIG. 4 illustrates an exemplary encoding of a normalized kurtosis k using icon shape;

FIG. 5 illustrates an exemplary encoding of a normalized skew using icon shapes;

FIG. 7 is pseudo code for an exemplary implementation of a stabilized Voronoi-based icon layout algorithm incorporating features of the present invention;

DETAILED DESCRIPTION OF PREFERRED EMBODIMENTS

The present invention provides a dynamic icon-based visualization system 100 that helps users understand, evaluate, and adjust complex multidimensional clustering results. The disclosed dynamic icon-based visualization system 100 encodes the raw data values in multiple dimensions as well as the statistical information related to cluster quality. The encoded statistical information provides visual cues to facilitate cluster evaluation and adjustment. The disclosed dynamic icon-based visualization system 100 employs an icon design that can be conveniently embedded into a wide range of presentations. Moreover, the disclosed dynamic icon-based visualization system 100 supports intuitive user interactions for cluster refinement.

According to one aspect of the invention, a multidimensional cluster icon design is provided that encodes multiple data attributes as well as derived statistical information for cluster interpretation and quality evaluation. According to another aspect of the invention, a stabilized icon layout algorithm is provided that generates similar icons for similar clusters for cluster comparison. In addition, intuitive user interactions are provided to support cluster refinement via direct manipulation of icons. A treemap-like space filling technique can be used to pack features of each cluster entity into an organized and stabilized hierarchy. Global statistical information can be embedded using icon shape and local statistics can be captured through the use of color (or hash patterns).

System Overview

Figure 1:
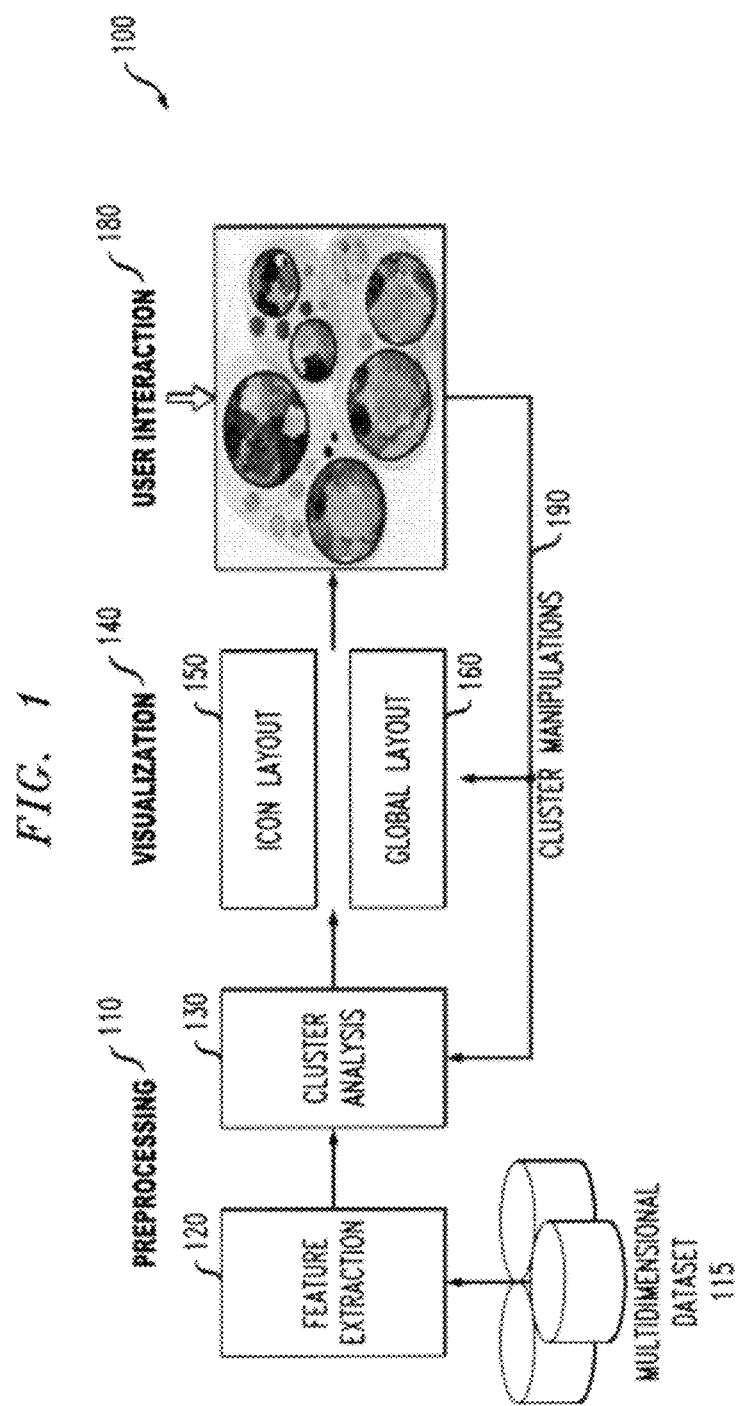
FIG. 1 illustrates an exemplary architecture for the dynamic icon-based visualization system.

FIG. 1 illustrates an exemplary architecture for the dynamic icon-based visualization system 100. As shown in FIG. 1, the exemplary dynamic icon-based visualization system 100 comprises a preprocessing module 110 that includes a feature extraction block 120 to extract key features of a multidimensional dataset 115 and includes a cluster analysis block 130 that conducts a cluster analysis. The exemplary cluster analysis is based on these extracted features to transform raw data from the multidimensional dataset 115 into a set of exemplary entity records in the form of <id|cid|$f_1$, $f_2$, ... $f_n$|$a_1$|$a_2$| ... |$a_n$>, where id is the record id, cid is the cluster id, $f_i$ is the ith feature and $a_n$ is the nth non-feature attribute.

A visualization module 140 first generates cluster icons via a cluster layout algorithm 150, discussed further below in a section entitled "Icon Layout," and in conjunction with FIG. 7. The visualization module 140 then performs a global layout process 160, discussed further below in a section entitled "Global Layout," and in conjunction with FIG. 8, to arrange the generated icons within the overall visualization canvas. A user interaction module 180 supports user manipulations of the cluster icons as described further below in a section entitled "Interactions." As shown in FIG. 1, these operations are fed back as cluster manipulations 190 into the preprocessing module 110 and visualization module 140 to enable user driven data exploration.

Visualization Design Guidelines

The exemplary dynamic icon-based visualization system 100 follows a number of exemplary design guidelines.

A cluster's visual representation should present different levels of ganularity. Clusters contain information at several scales, ranging from specific entity data features, to individual entities, to overall clusters. An effective visual representation must convey each of these levels of detail. The exemplary dynamic icon-based visualization system 100 converts clustered data into an entity-feature-cluster hierarchy and uses a treemap-based technique to represent them. Connections between features for a single entity are preserved via interactive highlights during mouse-over events.

A multidimensional cluster's representation should employ consistent encodings across entity dimensions and scales. A cluster icon should uniformly apply visual encoding techniques across data dimensions and scales so that users can smoothly navigate across data dimensions and to reduce visual complexity. The exemplary dynamic icon-based visualization system 100 uses the same encoding technique, based on the size and color (or hash pattern) of areas, to represent all feature dimensions. This approach is repeated at the cluster level, providing a consistent representation across scales.

Icons for similar clusters should appear visually similar while dissimilar clusters should have icons that are easily distinguishable. Icons should provide at-a-glance representations that allow users to easily determine which clusters are similar and which are different. This design guideline is important for cluster comparison tasks. The exemplary dynamic icon-based visualization system 100 satisfies this design guideline by using a novel stable layout algorithm. This algorithm maintains consistent feature locations both within and across icons.

In addition, the visual representation should allow users to interactively manipulate clusters for refinement and exploration. Users should be able to select clusters to be merged, select entities to be removed from a cluster, and to select individual clusters for subdivision into finer grained sets. All changes in cluster membership should be visually reflected in a stable manner to maintain a user's mental map as much as possible. The exemplary dynamic icon-based visualization system 100 satisfies this guideline by providing a number of interactive cluster refinement features.

Visual Encoding

Following the above exemplary design guidelines, the exemplary dynamic icon-based visualization system 100 represents clusters of exemplary multidimensional patient data as compact glyphs. As multidimensional clusters naturally contain information at multiple scales, the exemplary dynamic icon-based visualization system 100 adopts a treemap-like visual encoding scheme.

Figure 2:
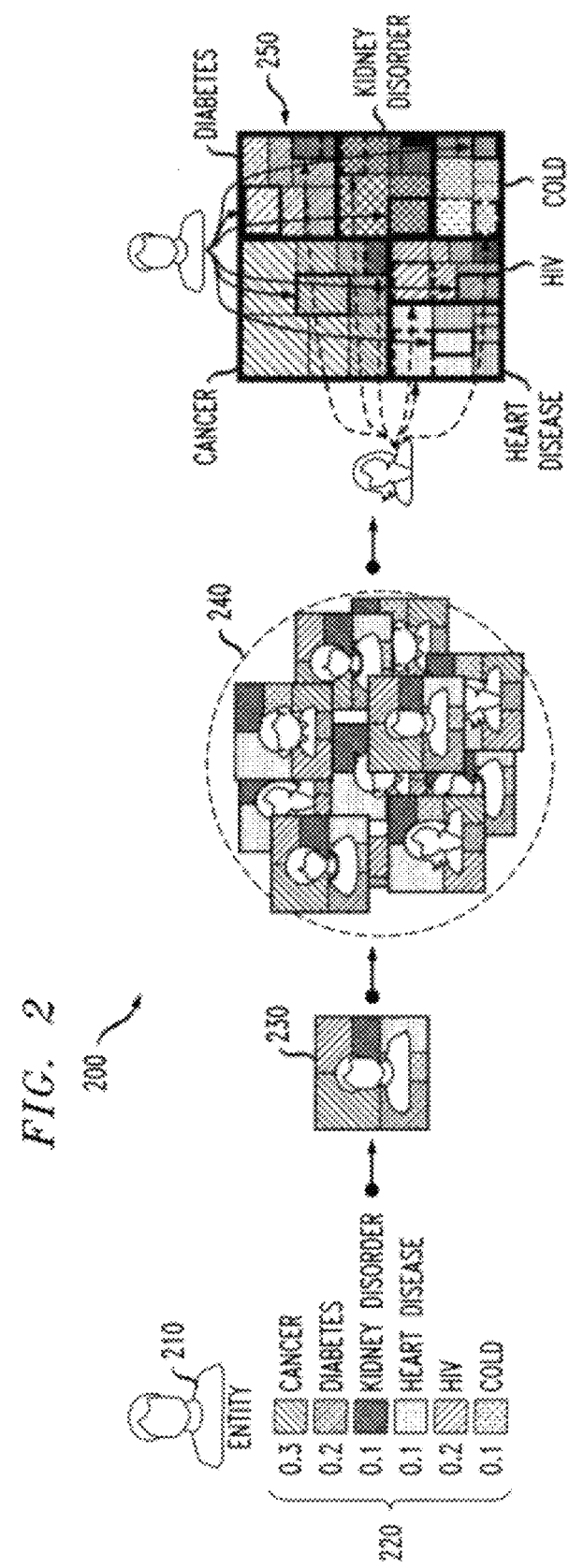
FIG. 2 illustrates an exemplary visual encoding for an exemplary patient dataset.

FIG. 2 illustrates an exemplary visual encoding 200 for an exemplary patient dataset. As discussed hereinafter, the exemplary visual encoding 200 uses a combination of spatial size, position, and color (or hash pattern) to convey key cluster properties. In the visual encoding 200, an individual entity, such as individual 210, is described by a feature vector 220. For example, an entity in N dimension is described by a vector with N features.

Each feature in the vector 220 is a numerical value depicted by a small cell. Each feature can be encoded by cells with colors and sizes. The cells are packed together to generate an individual icon 230, visualizing the entity 210. Individual icons are grouped together as represented by a collection of individuals 240 to form a group icon 250 by splitting and re-grouping their features into categories. For example, the group icon 250 can be visualized as an icon by splitting the features in the individual icons 230 and grouping the feature cells by category.

Generally, an n-dimensional data cluster contains a number of entities, each of which is described by a set of features, noted as $F=f_0, \ldots f_n$. For example, FIG. 2 depicts an entity 210 from a healthcare dataset that corresponds to the medical record of a single patient. The exemplary record 220 contains six features, including severity scores for various co-morbidities such as cancer and diabetes. The exemplary dynamic icon-based visualization system 100 assumes quantitative features, and the visual encoding process begins by globally normalizing the range of all features to the interval [0;1]. This enables the visualization of multiple features regardless of scale. A second local normalization step is performed on each entity such that the total value of all features equals one (i.e., $\Sigma_{i=0}^n f_i = 1$). The feature values are then mapped to color-coded cells (or hash-coded cells) in an icon 230 whose sizes represent the locally normalized values. As depicted in FIG. 2, the cells are packed together to form an iconic representation 230 of the entity 210. The local normalization step ensures that the total area for the icon is equal to one unit.

When a set of entities are grouped together into a cluster 240, as illustrated in FIG. 2, the entity icons must be combined into a single aggregate iconic representation 250. A cluster icon 250 is generated by (1) splitting each entity icon 230 into individual feature cells, (2) regrouping the feature cells by feature type, and (3) packing the regrouped cells into a single overall cluster icon 250, as shown in FIG. 2.

The packing process uses a hierarchical treemap layout where a cluster serves as the top level object, feature types form the second level of the hierarchy, and individual patient features make up the third and final level of the hierarchy. The exemplary area used for each entity's feature cells is normalized to one. Thus, the total size of a cluster icon represents the total number of entities in that cluster.

By default, each cell in a cluster icon 250 is rendered using the color or hash pattern assigned by its corresponding feature. For instance, all "cancer" cells in FIG. 2 would be rendered in the same shade of blue (or hash pattern). However, because of the local normalization step, a cell's size does not necessarily convey the raw magnitude of the value it represents. Instead, it represents the relative weight of the feature for a given entity. To allow comparison of raw data values, color (or hash) opacity can be optionally mapped to the raw feature values. When this approach is utilized, more heavily saturated cells correspond to cells with the highest non-normalized values for a given feature. This information is critical for some tasks, but also introduces visual complexity. For this reason, the exemplary dynamic icon-based visualization system 100 allows users to turn this feature off if not needed.

This exemplary design provides a number of key advantages. First, this exemplary design provides intuitiveness and efficiency by leveraging several well established techniques such as space filling and using color (or hash) opacity for data variances and diversities. Second, this exemplary design compresses high dimensional cluster information into relatively small cluster icons which can be easily embedded within other visualizations. Third, the icons show which clusters are similar to each other while providing visual cues for more detailed analysis. Fourth, the approach scales to work effectively with large numbers of clusters. Finally, the icons enable interactive manipulation, as discussed further below in the section entitled "Interactions."

The number of feature dimensions that can be visualized at any one time is limited because each must be represented by a unique user distinguishable color (or hash pattern). To alleviate this problem, feature selection can be used to identify the key features that should be included in a given visualization. Another challenge is that it can be hard for users to obtain precise feature values from our representation. However, it is believed that information loss is a reasonable trade-off for the benefits of representing multidimensional information using small, compact icons.

Visual Cues and Statistic Embedding

To further strengthen the exemplary visual encodings, statistical measures are embedded into the exemplary cluster icons 250. These measures provide additional information that helps during cluster quality evaluation. Statistical measures are considered at both global cluster level and at the local feature level as summarized in FIG. 3. FIG. 3 is a sample table 300 summarizing the moments and visual cues, discussed hereinafter, for various metrics.

Global Measures.

Several standard moments are selected as global measures and embedded into cluster icons via an icon's overall shape. FIGS. 4 and 5 show examples of how icon shape can be used to simulate the underlying data distribution.

FIG. 4 illustrates an exemplary encoding of a normalized kurtosis k using icon shape. As shown in FIG. 4, the shape of an icon, such as icons 410, 420, 430, intuitively shows the distributions of underlying data. Two linear functions k'(k) and k"(k) can be formed by combining k and the original radii r of the icon. The linear functions are used to respectively present the height and the width of the top end of the ladder icon. The width of the bottom end is automatically adjusted to keep the icon size proportional to the number of its containing entities. FIG. 4 depicts the icons generated with different k value.

FIG. 5 illustrates an exemplary encoding of a normalized skew using icon shapes. The cluster skew is used to adjust the position of the top vertex of the triangle which represents the data asymmetry intuitively. Icons 510 and 520 have different skew values. Icon 530 is generated by combining both kurtosis and skew together.

Visual cues such as the "Peakness Cue" and "Asymmetry Cue" are thus provided in the exemplary embodiment. Similarly, the standard derivation for a cluster can be encoded using the same technique. Shape as a perceptive visual property provides high efficiency for cluster comparison. Unfortunately, the irregular icon shapes may make precise size comparisons more difficult. The exemplary dynamic icon-based visualization system 100 allows users to turn this feature on or off as needed during their analysis.

Local Measures.

Several measures are also considered at the feature level. Local measures can be encoded by controlling the color or hash pattern of individual cells. For example, as mentioned above, raw non-normalized feature values can be encoded using color (or hash) opacity to enable quantitative comparison within clusters.

For example, cluster quality can be evaluated using the difference between a feature's value and its mean. The difference is encoded using color (or hash) opacities and is enhanced by shades. Cells with higher color (or hash) saturation have a large difference from the mean and the sign of the difference is encoded by shade. This approach depicts a "Quality and Outlier Cue." Using this technique, high quality clusters appear with a more homogeneous representation in color opacity. A cluster's outlier cells, which have large differences from the mean, can be visually highlighted with a more saturated color and stronger shade.

To facilitate multidimensional analysis, consider the co-occurrence patterns of features. Given a normalized feature vector $F<f_1, \ldots, f_n>$, the co-occurrence probability $C_{ij}$ of two given features $f_i, f_j \epsilon F$ is defined as follows:

$$C_{ij} = \frac{P_{ij}}{\sum_{ij=1}^{n}(P_{ij})} \quad (1)$$

where $P_{ij}=f_i \cdot f_j$ and $f_i$ is the normalized feature value.

Two entity measures are designed based on $C_{ij}$ providing two additional cues: the "Feature Co-occurrence Cue" and the "Domination Cue." Intuitively, the co-occurrence cue highlights entities that have multiple correlated features. In other words, the co-occurrence cue shows the features having strong co-occurrence with other features. The domination cue highlights entities that are dominated by a few key features. For example, the domination cue can reveal that a cluster is dominated by only one feature while another cluster may not be dominated by any feature.

Interactions

The exemplary dynamic icon-based visualization system 100 allows users to interactively explore and refine the multi-dimensional clusters. The exemplary dynamic icon-based visualization system 100 allows users to interactively perform the following actions for cluster manipulations.

FIGS. 6A through 6E illustrate a number of exemplary user interactions that allow an exemplary user to group icon clusters into larger clusters using a merge operation, to perform split operations on icons or to highlight various features.

Merge.

Figure 6A:
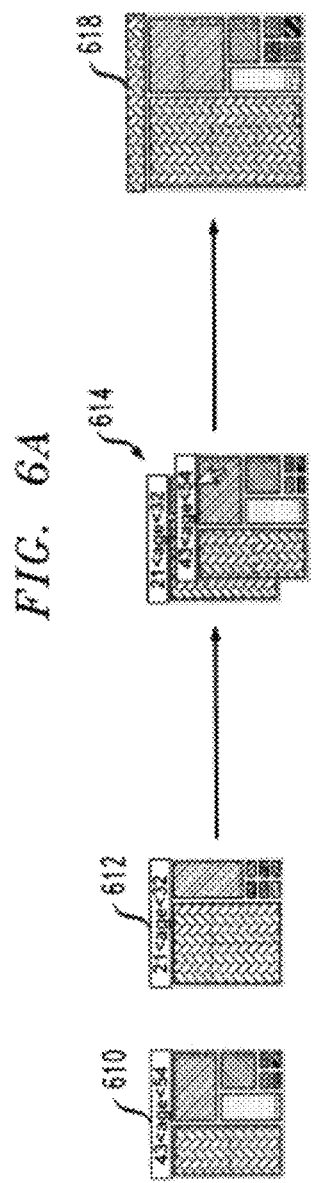
FIGS. 6A through 6E illustrate a number of exemplary user interactions that allow an exemplary user to group icon clusters into larger clusters using a merge operation, or to perform split operations on icons.
Figure 6B:
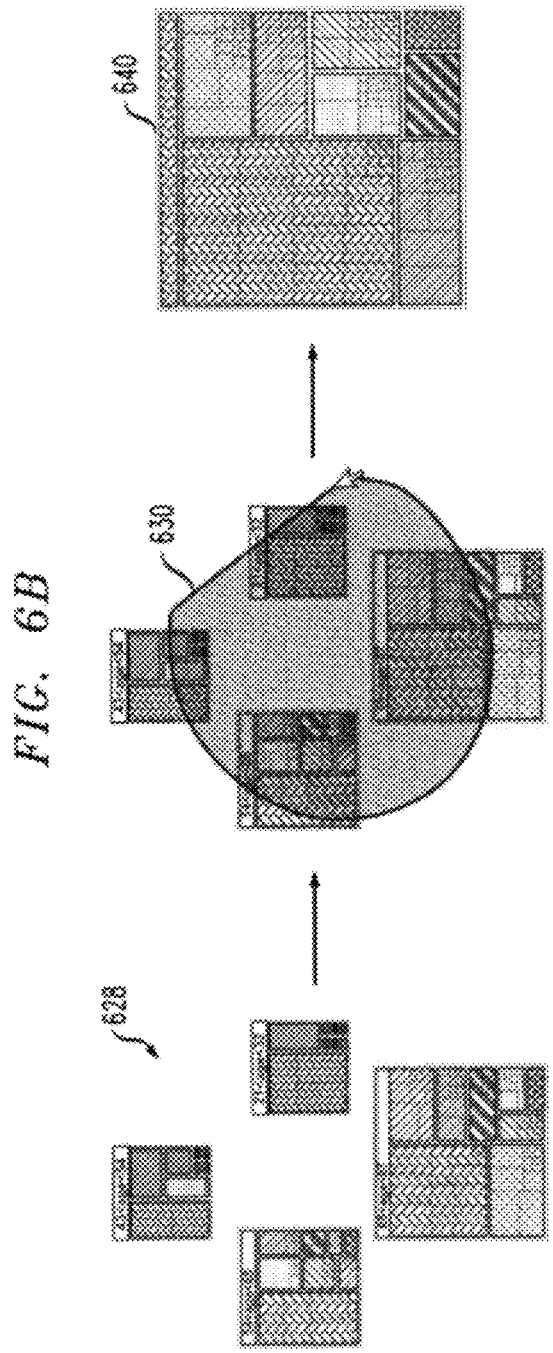

As shown in FIGS. 6A and 6B, users can merge cluster icons in two ways in an exemplary embodiment. First, as shown in FIG. 6A, users can use a drag and drop operation 614 to drag and drop a first icon 610 onto another icon 612. Performing this action will merge the two corresponding clusters and create a single new icon 618 to represent the newly created cluster. Second, as shown in FIG. 6B, users can merge two or more clusters 628 by drawing a lasso 630 around the corresponding icons. The exemplary dynamic icon-based visualization system 100 will then merge all clusters selected by the lasso into a single icon 640. The exemplary dynamic icon-based visualization system 100 will animate the transition between states during the merging process to clearly illustrate the changes being made.

Split.

Figure 6C:
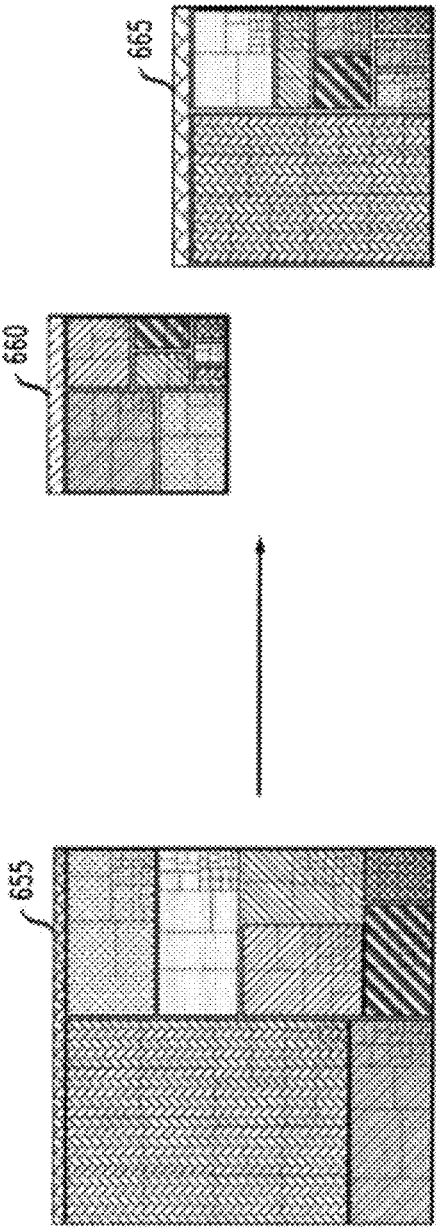
Figure 6D:
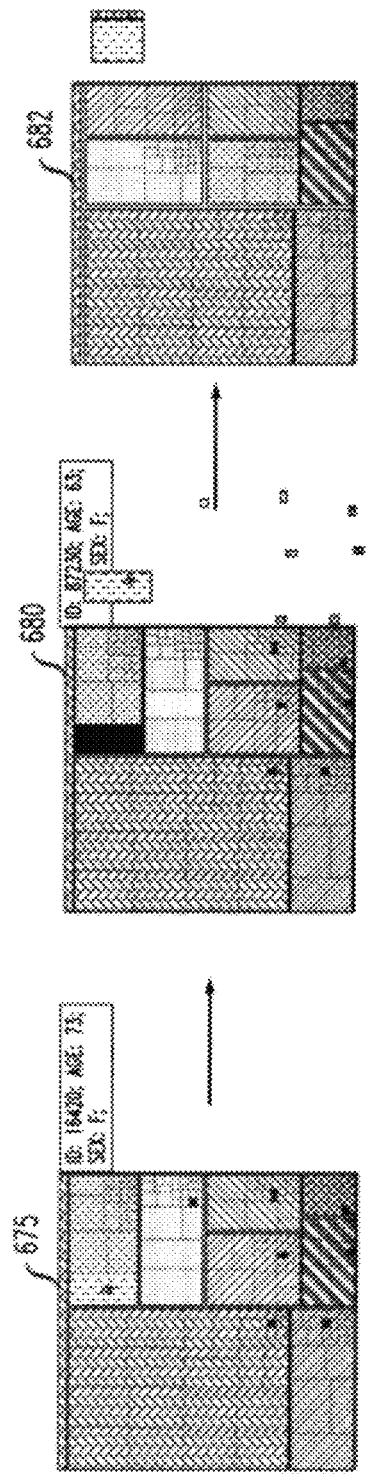

As shown in FIGS. 6C and 6D, given a cluster icon, users of an exemplary embodiment can perform several types of split operations. As shown in FIG. 6D, to remove specific outlier entities, users can simply click on an entity in an icon 675 and drag it out of the cluster as shown at stage 678. Releasing the mouse can finalize the split. As a result, the exemplary dynamic icon-based visualization system 100 creates a new cluster icon 682 to represent the split entity and updates the existing cluster icon 675 to reflect the split. As shown in FIG. 6C, users can also perform algorithmic split actions on an icon 655 via an optional popup context menu. After right clicking on a cluster, users can choose to perform either a binary split or an outlier split to create new icons 660, 665. The binary split operation breaks a cluster into two different sub-clusters by k-means. The outlier split operation removes the one percent of entities, for example, with the largest variance from the cluster.

Attribute Grouping.

Users of an exemplary embodiment can also explicitly request that data entities be re-clustered along various data dimensions. This feature allows users to consider non-feature entity attributes. For example, in an electronic medical record use case where diseases are features, patients could be grouped into clusters by non-feature attributes such as age, sex, or location. The exemplary dynamic icon-based visualization system 100 can handle attribute grouping for categorical, numerical, and temporal attributes.

Filtering.

The exemplary dynamic icon-based visualization system 100 allows users to filter the set of feature categories used for cluster icon generation. By default, all data attributes selected as features are used to generate cluster icons. For high-dimensional datasets with many such features, users can apply filters to reduce visual complexity and to focus in on a subset of the feature space.

Highlights.

Figure 6E:
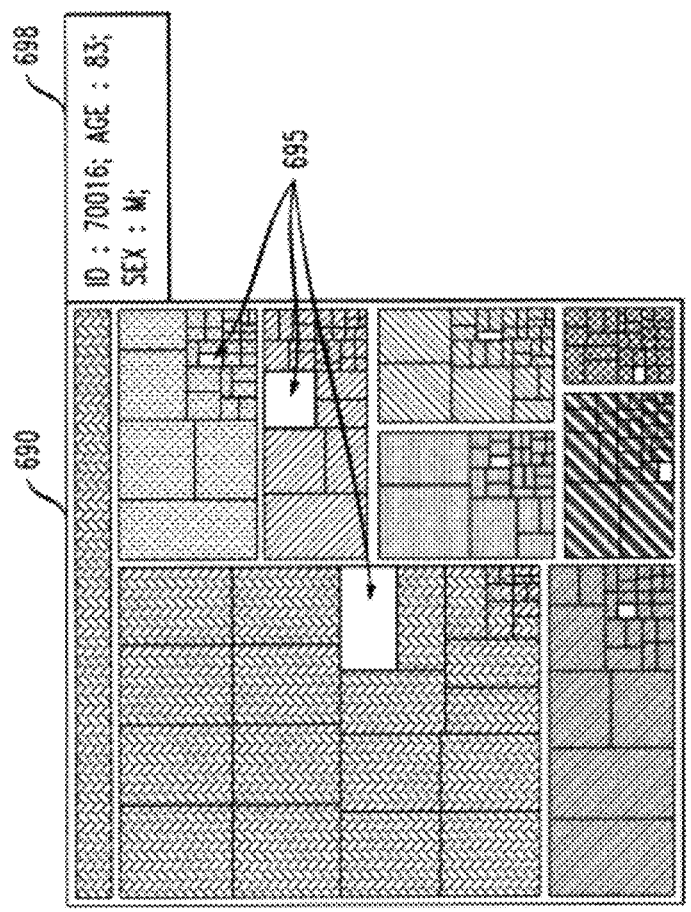

As shown in FIG. 6E, an exemplary encoding method spatially distributes an entity's feature cells across the cluster icon 690. Thus, the exemplary dynamic icon-based visualization system 100 supports entity highlights. When a user's mouse hovers over a specific feature cell, all of the corresponding entity's feature cells, such as 695, are highlighted. A tooltip can also be shown to depict the entity's key attributes.

Icon Layout

As previously indicated, a treemap scheme can be employed to encode the entity-feature-cluster hierarchy in the disclosed icons. As discussed hereinafter, treemap layouts have been studied and a number of existing techniques can be leveraged. However, traditional layouts cannot satisfy all requirements. Therefore, a stabilized Voronoi icon layout is also disclosed.

Traditional Treemap Icons

The rectangular treemap is a well-established technique used to visualize hierarchical structures. See, for example, M. Bruls et al., "Squarified Treemaps," Proc. of the Joint Eurographics and IEEE TCVG Symposium on Visualization (1999); B. Shneiderman, "Tree Visualization with Treemaps: 2-D Space-Filling Approach," ACM Trans. on Graphics, 11(1):92-99 (1992); B. Shneiderman and M. Wattenberg, "Ordered Treemap Layouts," IEEE Symp. on Information Visualization, Vol. 2001 73-8 (2001); or J. Wood and J. Dykes, "Spatially Ordered Treemaps," IEEE Trans. on Visualization and Computer Graphics, 14(6):1348-1355 (2008), incorporated by reference herein.

However, despite its computational efficiency, the rectangular treemap icon also has some significant limitations. First, the layout for rectangular treemaps may not be stable during the cluster refinement process. After users add or remove some entities to/from the cluster icon, the positions of cells may be shuffled and the layout may change dramatically. Second, there is no guarantee that similar icons will be generated for similar clusters. Traditional layout algorithms only do optimization within a single treemap. For multiple cluster icons, more constraints are needed to guarantee that the same features in different clusters are positioned in similar locations. Third, rectangular treemaps produce rectangular icons which cannot be shaped to embed global cluster statistics as described above. These limitations make rectangular treemaps inefficient for cluster comparison, refinement, and global statistic embedding.

Stabilized Voronoi Icons

To overcome the limitations of rectangular treemaps, a new Voronoi icon layout is provided that satisfies the design principles described herein. The exemplary Voronoi icon layout algorithm introduces a stability factor while leveraging the centroidal Voronoi tessellation (see, Q. Du et al., "Centroidal Voronoi Tessellations: Applications and Algorithms," SIAM Review, 41(4):637-76 (1999)) and weighted Voronoi diagrams (M. Balzer and O. Deussen, "Voronoi Treemaps," IEEE Symp. on Information Visualization, 0:7 (2005)).

Weighted Voronoi Diagrams. Given a set $P=p_1, \ldots, p_n$ of sites (initial points), a Voronoi Tessellation is a subdivision of the space into n cells, one for each site in P, with the property that a point q lies in the cell corresponding to a site $p_i$ if and only if $d(p_i, q) < d(p_j, q)$ for i distinct from j (d is a distance metric function). The segments in a Voronoi Tessellation correspond to all points in the plane equidistant to the two nearest sites.

Weighted Voronoi diagrams use a weight $w_i$ assigned to each point in $p_i$ as part of the distance measure. The following additively weighted power distance measure can be used to create Voronoi tessellations with straight line boundaries:

$$d(p_i, q) = \|p_i - q\|^2 - w_i^2 \qquad (2)$$

Intuitively, one can consider the weighted Voronoi diagram as using circles as sites instead of points where the circles' radii are a function of the corresponding weight $w_j$.

Centroidal Voronoi Tessellation (CVT). A Voronoi tessellation is called centroidal when all of the tessellation's sites are located at the center of mass for their respective regions. It can be viewed as an optimal partition corresponding to an optimal distribution of sites. A number of algorithms can be used to generate centroidal Voronoi tessellations, including Lloyd's algorithm and the K-means algorithm ((see, Q. Du et al., referenced above). Recently, Balzer et al., referenced above, introduced an optimization algorithm for weighted centroidal Voronoi tessellations to generate Voronoi treemaps. Balzer's algorithm is extended herein by introducing a stabilized centroid.

Stabilized Voronoi Icon Layout. The exemplary dynamic icon-based visualization system 100 provides an exemplary stabilized Voronoi-based icon layout algorithm 700, shown in FIG. 7, that maintains the stability of Voronoi regions when cluster changes occur and maintains a predefined order for sites within an icon which places Voronoi regions next to each other according to their semantic similarities. In the exemplary stabilized Voronoi-based icon layout algorithm 700, the feature types are initially arranged in an order that is followed in all cluster icons. For example, the feature types can be ordered according to their importance or follow a predefined order with certain semantic meanings.

This site order is maintained during layout by carefully controlling the initial positions of their corresponding sites. Different strategies are used for different icon shapes. For example, for circular icons, the sites are initially laid out on a spiral line centered at and within the boundary circle. For rectangular icons, the sites are laid out line by line from left to right in order. A weighted CVT optimization is then performed which assigns a weight to each site based on the corresponding value and adjusts their positions and weights to obtain a proper tessellation.

The individual entity features are laid out inside the regions for each feature type by carefully controlling the positions and movements of their corresponding sites $S = s_1, \ldots, s_n$ during the CVT iteration. Intuitively, in each iteration, a site $s_i$ is moved towards its region $v_i$'s center of mass $c_i$ while trying to balance two other constraints. First, all similar sites should be positioned as close as possible to each other while positioning dissimilar sites far apart. At the same time, as entities are added or removed from a cluster, icon stability should be maintained by minimizing any changes in location from a site's previous optimal position $pre(s_i)$. Formally, these constraints are captured in a layout model that tries to minimize the following objective function:

$$\mu_1 \sum_i |X_i - c_i|^2 + \mu_2 \sum_{i<j} (\overline{\omega}_{ij} |X_i - X_j| - d_{ij})^2 + \mu_3 \sum_i |X_i - pre(X_i)| \qquad (3)$$

where $X_i$ is the coordinate of $s_i$. $c_i(c_x, c_y)$ is the mass center of the region $v_i$ which can be computed by following equations:

$$c_x = \frac{1}{6A} \sum_{i=0}^{N-1} (x_i + x_{i+1})(x_i y_{i+1} - x_{i+1} y_i) \qquad (4)$$

$$c_y = \frac{1}{6A} \sum_{i=0}^{N-1} (y_i + y_{i+1})(x_i y_{i+1} - x_{i+1} y_i)$$

where A is the area of $v_i$, and $(x_i, y_i)$ is the ith vertex of polygon $v_i$.

In the layout model described in Formula 3, $d_{i,j}$ is the semantic similarity between two sites $s_i$ and $s_j$ of features $f_i$ and $f_j$. It is defined by the feature vectors $v_i$ and $v_j$ of the entities $e_i$ and $e_j$. Cosine similarity between vector $v_i$ and $v_j$ is adopted in an exemplary implementation. The weights $\mu_k$ ($\Sigma_k \mu_k = 1$ and $0 < \mu_k < 1$) balance the three parts of the exemplary layout model. They are changed adaptively during each CVT iteration using several heuristic strategies. Intuitively, $\alpha$ is kept larger than the other two weights. The iteration should stop at a position where $s_i$ is at or close to its mass center $c_i$. Then, the errors of each part are computed in the formula and the weight of the part that has the largest error is increased while the weight of the part that has smallest error is decreased. In this way, the part with the largest error is the focus for minimization during the next iteration. The exemplary VoronoiIconLayout( ) algorithm 700 leverages a stress majorization (see E. Gansner et al., "Graph Drawing by Stress Majorization," Graph Drawing, 239-50 (2005)) technique to provide a local minimization of the model.

The exemplary VoronoiIconLayout( ) algorithm 700 satisfies the design principles discussed herein. The exemplary VoronoiIconLayout( ) algorithm 700 has a time complexity of $O(n^2)$ for each iteration which is the same as Balzer's algorithm but worse than Lloyd's CVT algorithm ($O(n \log(n))$). To have the benefits of both real time interaction and high-quality layouts, the exemplary dynamic icon-based visualization system 100 supports both rectangular treemap icons as well as the optimized Voronoi icons. The first are used to support real time exploratory interactions. Because of its efficiency, users can group any set of entities and clusters to generate new icons in real time. Switching to the Voronoi view helps users better understand and compare the clustering results.

Global Layout

Figure 8:
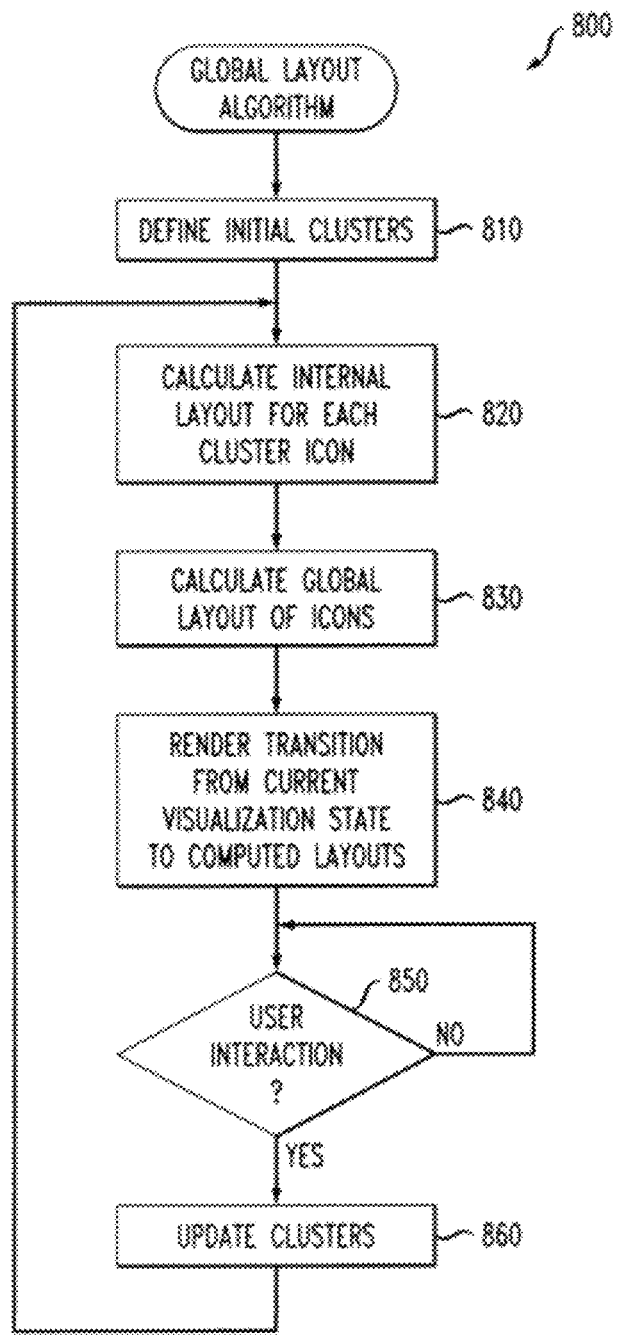
FIG. 8 is a flow chart describing an exemplary implementation of a global layout algorithm incorporating features of the present invention.

After the icon layout process completes, a global layout algorithm 800, shown in FIG. 8, positions the icons. As shown in FIG. 8, the exemplary global layout algorithm 800 initially defines the initial clusters during step 810. Thereafter, the exemplary global layout algorithm 800 calculates an internal layout for each cluster icon during step 820, and calculates a global layout of icons during step 830. The exemplary global layout algorithm 800 renders transitions from the current visualization state to computed layouts during step 840.

A test is performed during step 850, to determine if any user interaction commands are received. If it is determined during step 850 that user interaction commands are not received, then program control waits until a user interaction is received. If, however, it is determined during step 850 that user interaction commands are received, then the appropriate clusters are updated during step 860.

Various layout algorithms can be used for different purposes, for example, to embed the icons within another visualization. For example, when icons are used to represent geographical clusters, the icons can be globally laid out on a map based on their locations. In addition, the disclosed icons can also be used in conjunction with scatter plots, or can be applied to a multi-relational graph visualization to reveal both patient communities and their relationships. The communities are generated according to patient similarities over multiple diagnoses and represented using icons. The link colors and thicknesses can encode different types of relations and their strengths, respectively. The layout of the icons in the graph can be computed using a force-based model.

The exemplary dynamic icon-based visualization system 100 can provide an MDS-based projection to layout cluster icons based on their similarity. A fast overlap removal algorithm (see, e.g. T. Dwyer et al., "Fast Node Overlap Removal," Graph Drawing, 153-164 (2006)) can be adopted to avoid overlapping icons. A fast overlap removal algorithm eliminates overlaps while retaining each icon's original position as much as possible. Some improvements were made to these algorithms to facilitate interactive cluster manipulations. First, icon movement when clusters change is minimized by smoothing positional changes based on the icons' previous positions. Second, an incremental layout technique is used for split and merge commands. For example, when entities are split off from a cluster, only modified clusters (including any newly created clusters) are re-laid out in a sub-area followed by a global overlap removal. In this way, the positions for far away cluster icons are not affected.

Animated Transitions

When a cluster manipulation interaction such as attribute grouping or merging is applied, the icons may be reorganized and re-laid out to generate a new presentation of the data. In the exemplary dynamic icon-based visualization system 100, this changing process can be smoothly conveyed using a multi-step animated transition. First, feature cells for entities that change clusters are split from their original icon. Second, all of the feature cells are moved to their new location and their shapes are changed accordingly. Finally, the feature cells are repacked together under a new organization. During the second step, a naive approach to moving feature cells can create complex visual movements that are often confusing and hard to follow.

To overcome this problem, a transition path bundling technique can be employed. A transition path bundling technique aggregates the feature cells for each cluster into transition groups according to their movement trends. Each trend is defined using a polyline that describes the overall direction of movement. All the transition paths in a group are bundled together using a B-spline based on the control points of their associated trends. This spline guides the animation path. The trends are computed by using the innate hierarchy of the disclosed icon design. This algorithm is inspired by edge bundling. See, for example, D. Holten, "Hierarchical Edge Bundles: Visualization of Adjacency Relations in Hierarchical Data," IEEE Trans. on Visualization and Computer Graphics, 741-48 (2006).

Figure 9B:
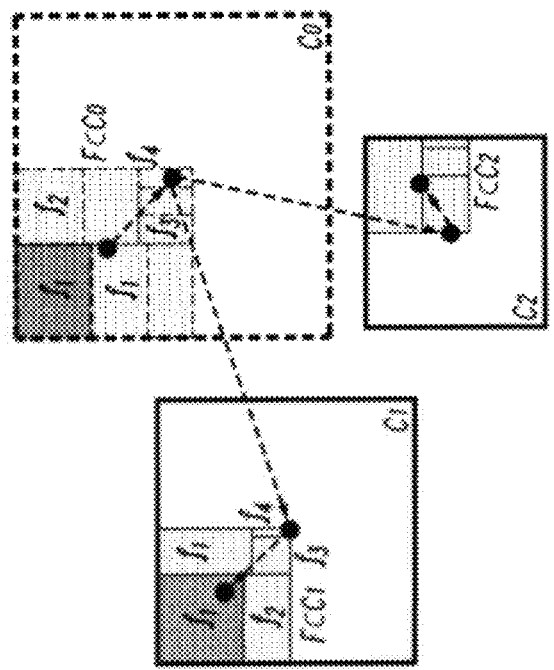
FIG. 9 illustrates an exemplary cluster $C_0$ that is split into two smaller clusters $C_1$ and $C_2$.
Figure 9A:
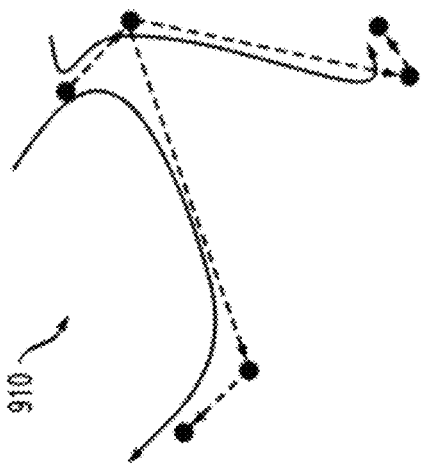

To illustrate the algorithm, consider a sample split interaction. Suppose a cluster $C_0$ is to be split into two smaller clusters $C_1$ and $C_2$, as shown in FIG. 9A. Feature cell $f_1$, along with other feature cells $f_j$, will be split from $C_0$ and packed into a new icon for cluster $C_1$.

Similarly, the remaining feature cells from $C_0$ will move to cluster $C_2$. The trend for feature $f_1$ is then defined as a polyline that connects the centers of $f_1$'s feature type region in the $C_0$ icon, the $C_0$ icon, the $C_1$ icon, and its corresponding feature type region in $C_1$. The transition curves 910 defined by the features' polyline trends are used to smoothly animate the feature cells as shown in FIG. 9B.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 10:
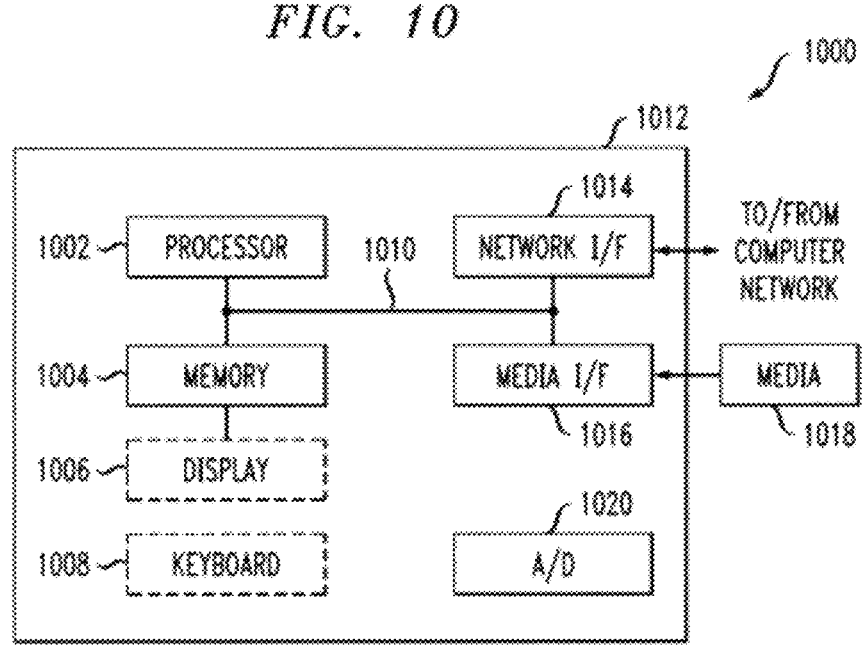
FIG. 10 depicts a computer system that may be useful in implementing one or more aspects and/or elements of the present invention.

One or more embodiments can make use of software running on a general purpose computer or workstation. FIG. 10 depicts an exemplary multi-faceted visualization tool 1000 that may be useful in implementing one or more aspects and/or elements of the present invention. With reference to FIG. 10, such an implementation might employ, for example, a processor 1002, a memory 1004, and an input/output interface formed, for example, by a display 1006 and a keyboard 1008. The memory 1004 may store, for example, code for implementing the layout process 300 of FIG. 3.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Analog-to-digital converter(s) 1020 may be provided to receive analog input, such as analog video feed, and to digitize same. Such converter(s) may be interconnected with system bus 1010.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1018 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 1002. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for visualizing a data set, comprising:
    obtaining a clustering of a multidimensional dataset comprising a plurality of entities, wherein said entities are instances of a particular concept and wherein each entity comprises a plurality of features;
    generating a visual icon for at least one of said entities, said visual icon having a plurality of regions, wherein each region corresponds to one of said features of said at least one entity, and wherein a size of each region is based on a value of said corresponding feature, wherein at least one data cluster is encoded into said visual icon using a hierarchical encoding scheme comprising a multi-level hierarchy of cluster as a first level object, feature type as a second level of the hierarchy, wherein said second level is below said first level, and entity as a third level of the hierarchy, wherein said third level is below said second level, to provide a visualization simultaneously having a plurality of said cluster level, said feature type level and said entity level of granularity; and
    updating one or more clusters in said generated visual icon in response to one or more user interaction commands received using an input/output interface.

2. The method of claim 1, wherein said values of said corresponding features are normalized.

3. The method of claim 1, wherein each of said features are uniquely encoded.

4. The method of claim 3, wherein each of said features are encoded with a unique color and wherein a distribution of said colors indicates a distribution of said corresponding feature value.

5. The method of claim 1, further comprising the step of merging a plurality of said visual icons into a single visual icon.

6. The method of claim 5, wherein an outer shape of said single visual icon conveys one or more cluster statistical measures.

7. The method of claim 5, wherein said merging step further comprises the step of decomposing said plurality of visual icons into said feature values and then regrouping said feature values into said single visual icon.

8. The method of claim 5, further comprising the step of animating transitions of said plurality of visual icons into said single visual icon following said merging step.

9. The method of claim 1, further comprising the step of splitting at least one of said visual icons for a plurality of said entities into a plurality of visual icons.

10. The method of claim 9, further comprising the step of animating transitions of said at least one visual icon into a plurality of visual icons following said splitting step.

11. The method of claim 1, wherein each of said visual icons conveys one or more statistical measures.

12. The method of claim 11, wherein an outer shape of each visual icon conveys said one or more statistical measures.

13. The method of claim 11, wherein one or more of a color, hash pattern or shading of each of said plurality of regions conveys said one or more statistical measures.

14. The method of claim 1, further comprising the step of employing a stabilized Voronoi-based icon layout algorithm to substantially maintain a stability of Voronoi regions when cluster changes occur.

15. The method of claim 1, further comprising the step of employing a stabilized Voronoi-based icon layout algorithm to substantially maintain a predefined order for regions within a visual icon that places Voronoi regions next to each other according to semantic similarities.

16. The method of claim 1, further comprising the step of embedding said visual icon for at least one of said entities in a visualization of said multidimensional dataset.

17. A system for visualizing a data set, comprising:
a memory; and
at least one processor, coupled to the memory, operative to:
obtain a clustering of a multidimensional dataset comprising a plurality of entities, wherein said entities are instances of a particular concept and wherein each entity comprises a plurality of features;
generate a visual icon for at least one of said entities, said visual icon having a plurality of regions, wherein each region corresponds to one of said features of said at least one entity, and wherein a size of each region is based on a value of said corresponding feature, wherein at least one data cluster is encoded into said visual icon using a hierarchical encoding scheme comprising a multi-level hierarchy of cluster as a first level object, feature type as a second level of the hierarchy, wherein said second level is below said first level, and entity as a third level of the hierarchy, wherein said third level is below said second level, to provide a visualization simultaneously having a plurality of said cluster level, said feature type level and said entity level of granularity; and
update one or more clusters in said generated visual icon in response to one or more user interaction commands received using an input/output interface.

18. An article of manufacture for visualizing a data set, comprising a non-transitory machine readable recordable medium containing one or more programs which when executed implement the steps of:
obtaining a clustering of a multidimensional dataset comprising a plurality of entities, wherein said entities are instances of a particular concept and wherein each entity comprises a plurality of features;
generating a visual icon for at least one of said entities, said visual icon having a plurality of regions, wherein each region corresponds to one of said features of said at least one entity, and wherein a size of each region is based on a value of said corresponding feature, wherein at least one data cluster is encoded into said visual icon using a hierarchical encoding scheme comprising a multi-level hierarchy of cluster as a first level object, feature type as a second level of the hierarchy, wherein said second level is below said first level, and entity as a third level of the hierarchy, wherein said third level is below said second level, to provide a visualization simultaneously having a plurality of said cluster level, said feature type level and said entity level of granularity; and
updating one or more clusters in said generated visual icon in response to one or more user interaction commands received using an input/output interface.

* * * * *